United States Patent
Yu et al.

(10) Patent No.: US 12,482,859 B2
(45) Date of Patent: Nov. 25, 2025

(54) PREPARATION AND APPLICATION OF A POLYROTAXANE-BASED POLYMER ELECTROLYTE

(71) Applicant: Beijing University of Technology, Beijing (CN)

(72) Inventors: Haijun Yu, Beijing (CN); Lingqiao Wu, Beijing (CN); Peipei Ding, Beijing (CN); Xianwei Guo, Beijing (CN)

(*) Notice: Subject to any disclaimer, the term of this patent is extended or adjusted under 35 U.S.C. 154(b) by 0 days.

(21) Appl. No.: 18/833,895

(22) PCT Filed: Oct. 31, 2023

(86) PCT No.: PCT/CN2023/128258
§ 371 (c)(1),
(2) Date: Jul. 27, 2024

(87) PCT Pub. No.: WO2024/139657
PCT Pub. Date: Jul. 4, 2024

(65) Prior Publication Data
US 2025/0316755 A1    Oct. 9, 2025

(30) Foreign Application Priority Data
Dec. 29, 2022 (CN) .......................... 202211742066.9

(51) Int. Cl.
*H01M 10/0565* (2010.01)
*H01M 4/04* (2006.01)
(Continued)

(52) U.S. Cl.
CPC ..... *H01M 10/0565* (2013.01); *H01M 4/0404* (2013.01); *H01M 4/131* (2013.01);
(Continued)

(58) Field of Classification Search
CPC . H01M 2300/0085; H01M 2300/0082; H01M 10/0565; H01M 4/622
See application file for complete search history.

(56) References Cited

U.S. PATENT DOCUMENTS

| | | | |
|---|---|---|---|
| 2003/0138398 A1* | 7/2003 | Okumura | C08G 83/007 424/78.38 |
| 2009/0030108 A1* | 1/2009 | Ito | C08G 83/007 523/106 |

(Continued)

FOREIGN PATENT DOCUMENTS

| | | | | |
|---|---|---|---|---|
| CN | 106785032 A | 5/2017 | | |
| CN | 111276660 | * 6/2020 | ........ | H01M 10/0525 |

(Continued)

OTHER PUBLICATIONS

English translation of CN 111276660 (Year: 2020).*
English translation of JP 2015/191866 (Year: 2015).*

*Primary Examiner* — Yoshitoshi Takeuchi
(74) *Attorney, Agent, or Firm* — Shen Huang

(57) ABSTRACT

The invention discloses A preparation method of polyrotaxane polymer electrolyte and its application, and belongs to the technical field of lithium ion batteries. The polyrotaxane polymer is composed of a linear polymer, a cyclic molecule and an end-capping molecule. The polyrotaxane polymer electrolyte is composed of a polyrotaxane polymer, a conductive lithium salt and a porous support material. The polymer electrolyte is simple in preparation process, free of byproducts and excellent in electrochemical performance. The room-temperature ionic conductivity can be greater than $10^{-3}$ Scm$^{-1}$, and the electrochemical window can be greater than 5V (vs.Li$^+$/Li); and the lithium metal battery assembled by the composite material has excellent cycle performance at room temperature. The interfacial compatibility of the polymer electrolyte and the electrode can be obviously (Continued)

improved, so that the electrochemical performance and the safety performance of the battery are improved.

9 Claims, 1 Drawing Sheet

(51) Int. Cl.
| | |
|---|---|
| *H01M 4/131* | (2010.01) |
| *H01M 4/136* | (2010.01) |
| *H01M 4/1391* | (2010.01) |
| *H01M 4/1397* | (2010.01) |
| *H01M 4/38* | (2006.01) |
| *H01M 4/58* | (2010.01) |
| *H01M 4/62* | (2006.01) |
| *H01M 4/66* | (2006.01) |
| *H01M 10/0525* | (2010.01) |
| *H01M 4/02* | (2006.01) |

(52) U.S. Cl.
CPC ......... *H01M 4/136* (2013.01); *H01M 4/1391* (2013.01); *H01M 4/1397* (2013.01); *H01M 4/382* (2013.01); *H01M 4/5825* (2013.01); *H01M 4/623* (2013.01); *H01M 4/625* (2013.01); *H01M 4/661* (2013.01); *H01M 10/0525* (2013.01); *H01M 2004/027* (2013.01); *H01M 2004/028* (2013.01); *H01M 2300/0082* (2013.01); *H01M 2300/0085* (2013.01)

(56) References Cited

U.S. PATENT DOCUMENTS

| | | | | |
|---|---|---|---|---|
| 2018/0362691 | A1* | 12/2018 | Eisenbarth | C08G 83/007 |
| 2020/0087418 | A1* | 3/2020 | Inoue | C08G 65/04 |
| 2020/0227783 | A1* | 7/2020 | Boskamp | C08J 5/20 |
| 2024/0347768 | A1* | 10/2024 | Kang | C08L 5/16 |

FOREIGN PATENT DOCUMENTS

| | | | | |
|---|---|---|---|---|
| CN | 111542961 | A | 8/2020 | |
| CN | 112480418 | A | 3/2021 | |
| CN | 114976235 | A | 8/2022 | |
| CN | 115882061 | | 3/2023 | |
| JP | 2003257236 | A | 9/2003 | |
| JP | 2006241396 | A | 9/2006 | |
| JP | 2015/191866 | | * 11/2015 | ........ H01M 10/0562 |

* cited by examiner cyclic molecule: ◯    linear polymer: R1    capping molecule: R1

PREPARATION AND APPLICATION OF A POLYROTAXANE-BASED POLYMER ELECTROLYTE

TECHNICAL FIELD

The present invention relates to a polyrotaxane polymer electrolyte and its application in a lithium ion battery, in particular to a solid polymer electrolyte that can be used in a lithium ion battery, which belonging to the technical field of solid-state batteries.

BACKGROUND

Lithium-ion batteries consist of components such as positive electrode, negative electrode, electrolyte, separator, and battery case. As an important component of lithium-ion batteries, electrolyte performance has attracted much attention. At present, there are two main types of electrolytes used in commercial lithium batteries: one is organic liquid electrolyte and the other is gel polymer electrolyte. Both electrolytes have high ionic conductivity, can effectively wet the electrodes and form stable solid electrolytes on the electrode surface, and have good performance. However, both types of electrolytes contain a large amount of organic solvents, such as ethylene carbonate, dimethyl carbonate, propylene carbonate, diethyl carbonate, etc. Since organic liquid electrolytes usually have high chemical activity, volatility, and easy ignition, lithium-ion batteries have great safety hazards, which seriously hinders the further popularization of lithium-ion batteries. The use of high-temperature resistant polymer solid electrolytes in solid-state batteries is believed to improve the safety of large batteries. The polymer solid electrolytes for solid-state batteries that have been reported include polyethylene oxide, polyacrylonitrile, polyvinylidene fluoride, polymethyl methacrylate, polypropylene oxide, polyvinylidene chloride, etc. However, the polymer solid electrolytes currently under research still have problems such as poor ion transport performance, poor antioxidant performance, large electrolyte interface impedance, and poor battery cycle stability, making the current research on polymer-based solid-state lithium-ion batteries difficult and difficult to apply. In order to improve the above problems, the present invention adopts polyrotaxane polymer electrolyte for lithium-ion battery system for the first time from the perspective of molecular design. The ion transport performance, electrochemical window and battery cycle stability of lithium-ion batteries using this electrolyte are significantly improved.

SUMMARY

The purpose of the present invention is to provide a polyrotaxane lithium-ion battery polymer electrolyte with excellent performance and a preparation method and application thereof.

The technical solution of the present invention is:

A polyrotaxane lithium-ion battery polymer electrolyte, characterized in that the polymer electrolyte comprises a polyrotaxane polymer and a conductive lithium salt;

A polyrotaxane lithium ion battery polymer electrolyte, characterized in that the polyrotaxane lithium ion battery polymer electrolyte is prepared from a linear polymer, a cyclic molecule, a capping molecule, a catalyst, and a lithium salt, wherein the linear polymer, cyclic molecule, and capping molecule form a polyrotaxane polymer; and the molar ratio of the linear polymer, the cyclic molecule, and the capping molecule is 1:(0.1-10):(0.1-10).

The catalyst accounts for 0.1%-10% of the linear polymer mass fraction, and the lithium salt accounts for 10%-80% of the linear polymer mass fraction; the polyrotaxyl lithium ion battery polymer electrolyte uses a porous support material as a carrier;

The linear polymer is selected from polyethylene glycol, polyvinyl alcohol, polypropylene glycol, or one or more of the sulfur, chlorine or fluorine substitutes of polyethylene glycol, polyvinyl alcohol and polypropylene glycol; the molecular weight of the linear polymer is in the range of 1000 to 1000000.

The cyclic molecule is selected from one or more of the crown ether group molecules and cyclodextrin type group molecules, the crown ether group molecules are selected from one or more of 18-crown ether-6, dibenzo-18 crown ether-6, 18-diaza crown ether-6, dibenzo-18-tetrathio crown ether-6, tetrabenzo-18-crown ether-6, cyclohexane-18-crown-6, 21-crown ether-7, 24-crown ether-8, the cyclodextrin type group molecules are α, β or γ type cyclodextrin, or the etherification, esterification, oxidation, cross-linking and other reaction products of the alcoholic hydroxyl groups on the surface of cyclodextrin, or the chlorine and fluorine substitution products of cyclodextrin;

The end-capping molecule is one or more of the following: hexamethylene diisocyanate (HDI), hexamethylene diisocyanate trimer (HDI trimer), diphenylmethane diisocyanate (MDI), toluene diisocyanate (TDI), (polymethyl polyphenyl isocyanate) (PAPI), (phenyl isocyanate) (PI), (isophorone diisocyanate) (IPDI), (octadecyl isocyanate) (ODI), dicyclohexylmethane diisocyanate (HMDI), lysine diisocyanate (LDI); the molecular weight of the end-capping molecule is in the range of (100-10000);

The conductive lithium salt is one or more of the following: lithium hexafluorophosphate ($LiPF_6$), lithium perchlorate ($LiClO_4$), lithium bis(trifluoromethanesulfonyl)imide (LiTFSI), lithium bis(fluorosulfonyl)imide (LiFSI), lithium bis(oxalatoborate) (LiBOB), bis(trifluoromethanesulfonyl)methyl lithium ($LiC(SO_2CF_3)_3$), lithium difluorooxalatoborate (LiDFOB);

The catalyst is one of the following: dibutyltin dilaurate, dibutyltin bis(acetylacetonate), azobisisoheptanenitrile (ABVN), azobisisobutyronitrile (AIBN), dimethyl azobisisobutyrate (AIBME), benzoyl peroxide (BPO), tertbutyl benzoyl peroxide (TBPB), methyl ethyl ketone peroxide (MEKPO), platinum water (Pt).

The porous support material is one or more of the following: cellulose non-woven fabric, polyethylene non-woven fabric, polypropylene non-woven fabric, glass fiber non-woven fabric, polytetrafluoroethylene non-woven fabric;

The preparation method of the above-mentioned polyrotaxane lithium-ion battery polymer electrolyte is as follows:

1) Dissolve the linear polymer and the cyclic molecule in a liquid solvent and stir for 2-10 hours to allow the linear polymer to pass through the cyclic molecule;

2) adding a certain amount of end-capping molecules and catalyst to the above solution and continuing stirring for 2-10 hours to obtain a polyrotaxane polymer solution;

3) adding a certain amount of lithium salt to the polyrotaxane polymer solution to form a uniform solution, thereby obtaining a polyrotaxane polymer electrolyte mixed solution;

4) The polyrotaxane polymer electrolyte mixed solution is coated on or immersed in a porous support material, and then cured by vacuum heating at 60° C.-120° C. for 2 h-12 h to obtain a fully solid polymer electrolyte membrane.

The solvent is one of the following: N-methylpyrrolidone, ethylene carbonate, propylene carbonate, butylene carbonate, dimethyl carbonate, ethylene carbonate, ethyl methyl carbonate, γ-butyrolactone, tetrahydrofuran, 2-methyltetrahydrofuran, acetonitrile, 1,2-dimethoxyethane, tetraethylene glycol dimethyl ether, triethylene glycol dimethyl ether, diethylene glycol dimethyl ether, and dimethyl sulfoxide.

The present invention provides a polymer-based lithium-ion battery with a polyrotaxane-based lithium-ion battery polymer electrolyte, characterized in that it comprises: a positive electrode, a negative electrode, and the above-mentioned polyrotaxane-based lithium-ion battery polymer electrolyte disposed between the positive electrode and the negative electrode and having both the functions of a separator and an electrolyte;

The polymer-based lithium-ion battery of the polyrotaxyl polymer electrolyte described above is characterized in that the positive electrode active material is one or more of lithium iron phosphate ($LiFeO_4$), lithium nickel cobalt aluminum (NCA), lithium-rich material (LLOs), lithium cobalt oxide ($LiCoO_2$), lithium ion lithium fluorophosphate, lithium nickel cobalt manganese oxide, lithium manganese oxide, lithium manganese oxide, lithium nickel manganese oxide, lithium iron manganese phosphate, and lithium nickel oxide ($LiNiO_2$); the negative electrode active material is one or more of metallic lithium, metallic lithium alloy, carbon silicon composite material, lithium titanate, graphite, lithium metal nitride, antimony oxide, carbon germanium composite material, and lithium titanium oxide;

The polymer-based lithium-ion battery with a polyrotaxane polymer electrolyte described above is characterized in that the preparation of the positive electrode comprises the following steps:

(1) the preparation of the positive electrode material, comprises the following steps: grinding and mixing 50%-90% by mass of a positive electrode active material and 5%-30% by mass of a conductive agent acetylene black, adding 1%-15% by mass of polyvinylidene fluoride (PVDF), 1%-15% by mass of a polyrotaxane polymer electrolyte, and 1-methyl-2-pyrrolidone to obtain the positive electrode material, wherein the 1-methyl-2-pyrrolidone is used to adjust the viscosity and is not included in the mass percentage composition of the positive electrode material;

(2) coating the positive electrode material on the surface of an aluminum foil and vacuum drying to obtain the positive electrode;

The polymer-based lithium-ion battery with a polyrotaxane polymer electrolyte described above is characterized in that metallic lithium or metallic lithium alloy can be directly used as the corresponding negative electrode; or the preparation of the negative electrode comprises the following steps:

(1) Preparation of negative electrode material: grinding and mixing 35%-85% by mass of negative electrode active material and 5%-30% by mass of conductive agent acetylene black, adding 5%-20% by mass of polyvinylidene fluoride (PVDF), 1%-20% by mass of polyrotaxane polymer electrolyte and 1-methyl-2-pyrrolidone and grinding and mixing to obtain a negative electrode material; wherein 1-methyl-2-pyrrolidone is used to adjust the viscosity and is not included in the mass percentage composition of the negative electrode material;

(2) coating on the surface of copper foil and drying to obtain a negative electrode.

The polymer-based lithium-ion battery with a polyrotaxane polymer electrolyte described above is characterized in that the polyrotaxane polymer electrolyte in the positive electrode material and the negative electrode material is composed of: the above-mentioned polyrotaxane polymer and a lithium salt.

The polyrotaxane polymer is composed of linear polymer, cyclic molecule, end-capping molecule and catalyst.

The lithium salt accounts for 10%-80% of the mass of the polyrotaxane polymer.

The innovation and practicality of the present invention are:

Compared with the existing polymer electrolyte system, the polyrotaxane polymer electrolyte provided by the present invention promotes ion transport through the synergistic effect of cyclic molecules and linear polymers in the system from the perspective of molecular design, thereby significantly improving the room temperature ionic conductivity and ion migration number of the electrolyte.

The present invention firstly confirms the structure of the polyrotaxane polymer electrolyte by solid-state nuclear magnetic resonance technology.

The polyrotaxane polymer electrolyte provided by the present invention can be adapted to different positive electrode materials, and the solid-state lithium ion battery assembled with different positive electrode materials has excellent cycle stability.

THE PREFERRED EMBODIMENTS

Figure 1:
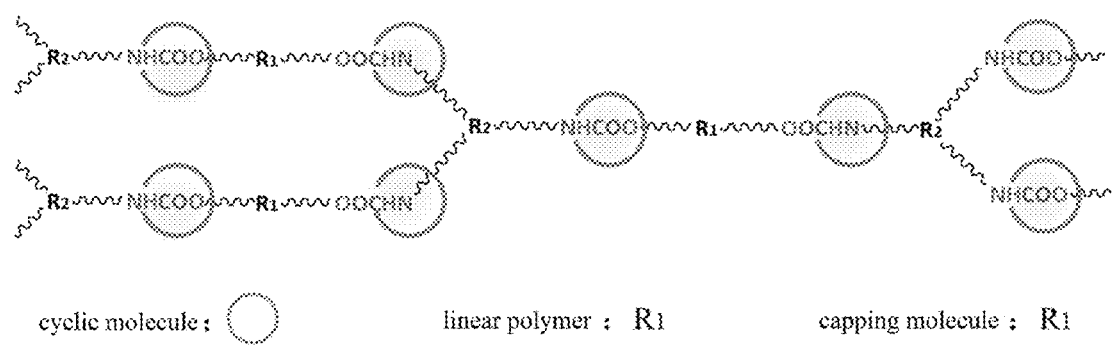
FIG. 1 is a structural diagram of a polyrotaxane polymer matrix in Example 7 of polymer electrolyte preparation.
Figure 2:
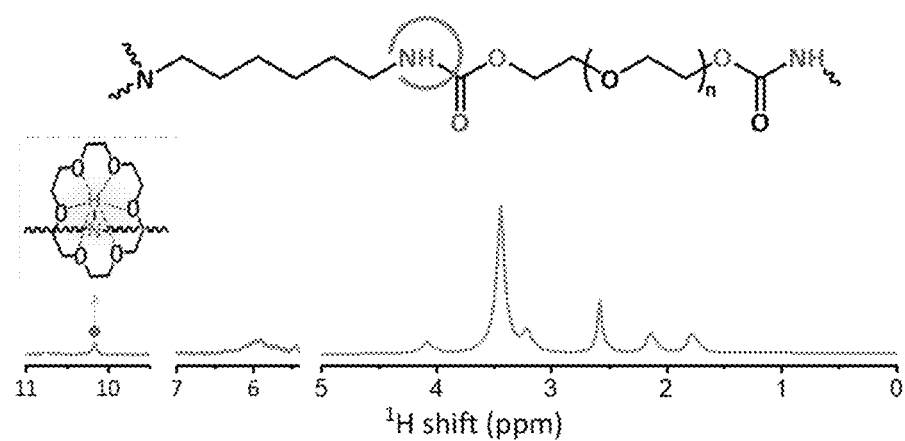
FIG. 2 is a solid-state NMR characterization spectrum of the polyrotaxane polymer matrix in Example 7 of the solid-state lithium-ion battery preparation.

The present invention is described below by means of specific examples, which are provided for a better understanding of the present invention and are by no means intended to limit the scope of the present invention.
Preparation of Polymer Electrolyte:

Example 1

In a glove box filled with argon, 1 g of polyethylene glycol and 1 g of 15-crown ether 5 were dissolved in acetonitrile solvent, and 0.5 g of toluene diisocyanate and 10 mg of dibutyltin dilaurate were added after stirring for 4 h. After stirring for 3 h, 0.8 g of lithium bistrifluoromethanesulfonyl imide (LiTFSI) was added and stirred to completely dissolve. On a polytetrafluoroethylene mold, with a Whatman membrane as a porous support skeleton, the evenly stirred mixture was scraped onto both sides of the Whatman membrane; and the mixture was heated in a vacuum drying oven at 80° C. for 10 hours to form a film.

Example 2

In a glove box filled with argon, 1 g of polyethylene glycol and 1 g of 18-crown ether 6 were dissolved in N-methylpyrrolidone solvent, and 0.5 g of hexamethylene diisocyanate and 15 mg of azobisisobutyronitrile were added after stirring for 4 h. After continuing to stir for 3 h, 1g of lithium bistrifluoromethanesulfonyl imide (LiTFSI) was added and stirred to completely dissolve. On a polytetrafluoroethylene mold, with a Whatman membrane as a porous support skeleton, the evenly stirred mixture was scraped onto both sides of the Whatman membrane; and heated in a vacuum drying oven at 100° C. for 12 h to solidify into a film.

Example 3

In a glove box filled with argon, 2 g of polyvinyl alcohol and 1 g of 18-diazacrown ether-6 were dissolved in dimethyl sulfoxide solvent, and 1 g of diphenylmethane diisocyanate and 10 mg of dibutyltin dilaurate were added after stirring for 4 h. After continuing to stir for 3 h, 1 g of lithium bis(fluorosulfonyl)imide (LiFSI) was added and stirred to completely dissolve. On a polytetrafluoroethylene mold, with a Whatman membrane as a porous support skeleton, the evenly stirred mixture was scraped onto both sides of the Whatman membrane; and heated in a vacuum drying oven at 80° C. for 12 hours to solidify into a film.

Example 4

In a glove box filled with argon, 1.5 g of polypropylene glycol and 1 g of 21-crown ether-7 were dissolved in dimethyl carbonate solvent. After stirring for 4 h, 0.5 g of diphenylmethane diisocyanate and 10 mg of dibutyltin dilaurate were added. After continuing to stir for 3 h, 1 g of lithium bis(fluorosulfonyl)imide (LiFSI) was added and stirred to completely dissolve. On a polytetrafluoroethylene mold, with a cellulose membrane as a porous support skeleton, the evenly stirred mixture was scraped onto both sides of the cellulose membrane; and the mixture was heated in a vacuum drying oven at 90° C. for 14 hours to solidify into a film.

Example 5

In a glove box filled with argon, 1.5 g of polyethylene glycol and 1 g of 2,4-crown ether-8 were dissolved in acetonitrile solvent. After stirring for 4 h, 0.3 g of dicyclohexylmethane diisocyanate and 10 mg of azobisisobutyronitrile were added. After continuing to stir for 3 h, 1 g of lithium hexafluorophosphate (LiPF$_6$) was added and stirred to completely dissolve. On a polytetrafluoroethylene mold, with a cellulose membrane as a porous support skeleton, the evenly stirred mixture was scraped onto both sides of the cellulose membrane; and the mixture was heated in a vacuum drying oven at 90° C. for 14 hours to solidify into a film.

Example 6

In a glove box filled with argon, 1 g of polyethylene glycol and 1 g of 18-crown ether-6 were dissolved in N-methylpyrrolidone solvent, and after stirring for 4 h, 0.224 g of hexamethylene diisocyanate trimer (HDI trimer) and 10 mg of dibutyltin dilaurate were added. After continuing to stir for 3 h, 1 g of lithium bis(trifluoromethanesulfonyl)imide (LiTFSI) was added and stirred to completely dissolve. On a polytetrafluoroethylene mold, with a Whatman membrane as a porous support skeleton, the evenly stirred mixture was scraped onto both sides of the Whatman membrane; and heated in a vacuum drying oven at 80° C. for 12 hours to solidify into a film.

Example 7

In a glove box filled with argon, 1 g of polyethylene glycol and 1 g of γ-cyclodextrin were dissolved in N-methylpyrrolidone solvent. After stirring for 4 h, 0.3 g of lysine diisocyanate (LDI) and 10 mg of dibutyltin dilaurate were added. After continuing to stir for 3 h, 1.5 g of lithium bis(fluorosulfonyl)imide (LiFSI) was added and stirred to completely dissolve. On a polytetrafluoroethylene mold, with a Whatman membrane as a porous support skeleton, the evenly stirred mixture was scraped onto both sides of the Whatman membrane; and heated in a vacuum drying oven at 80° C. for 12 hours to solidify into a film.

Electrolyte thickness: the thickness of the block polymer electrolyte was measured using a micrometer (accuracy 0.01 mm), and three points on the membrane were randomly selected for measurement to obtain the average value.

Ionic conductivity: the polymer electrolyte was sandwiched between two stainless steel gaskets and the impedance of a 2032 button cell was assembled and measured according to the formula $$\sigma = \frac{L}{SR},$$

where L is the thickness of the polymer electrolyte, S is the area of the stainless steel gasket, and R is the measured impedance value.

Electrochemical window: assemble a button cell of lithium metal polymer electrolyte stainless steel 2032 and perform linear voltammetric sweep measurement with a starting voltage of 2.8V, a maximum potential of 6.0V, and a scan rate of 1 mVS$^{-1}$, corresponding to the highest decomposition voltage, i.e., the electrochemical window.

Ion migration number: two lithium sheets are used to sandwich the polymer electrolyte to assemble a 2032 button cell and perform linear voltammetric sweep measurement Assemble lithium metal |polymer electrolyte | lithium metal symmetric cells and conduct DC polarization tests by applying a constant voltage of 10 mV for a certain period of time.

Before and after the DC polarization test, the lithium metal |polymer electrolyte | lithium metal symmetrical battery should be tested for impedance, and the frequency should be set to 1 MHz~0.1 Hz. Finally, the lithium ion migration number of the solid electrolyte is calculated according to the formula $$t_{Li^+} = \frac{I_{SS}(\Delta V - I_0 R_0)}{I_0(\Delta V - I_{SS} R_{SS})},$$

Wherein, $I_0$ represents initial current (A), $I_{SS}$ represents steady-state current (A), $R_0$ represents interfacial impedance of Li|electrolyte|Li symmetric cell before DC polarization (Ω), $R_{SS}$ represents interfacial impedance of Li|electrolyte|Li symmetric cell after DC polarization (Ω), ΔV represents applied polarization voltage (V).

| Example | Ionic conductivity (S cm$^{-1}$, 25° C.) | Electrochemical window (V) | Ion migration number (25° C.) |
|---|---|---|---|
| 1 | 8.40 × 10$^{-4}$ | 4.55 | 0.39 |
| 2 | 9.13 × 10$^{-4}$ | 4.90 | 0.58 |

-continued

| Example | Ionic conductivity (S cm$^{-1}$, 25° C.) | Electrochemical window (V) | Ion migration number (25° C.) |
|---|---|---|---|
| 3 | 1.01 × 10$^{-3}$ | 4.75 | 0.40 |
| 4 | 5.01 × 10$^{-4}$ | 4.80 | 0.59 |
| 5 | 7.18 × 10$^{-4}$ | 4.75 | 0.47 |
| 6 | 1.25 × 10$^{-3}$ | 5.00 | 0.65 |
| 7 | 1.01 × 10$^{-3}$ | 4.50 | 0.35 |

Preparation of solid-state lithium-ion batteries:

Example 8

240 mg of lithium iron phosphate and 35 mg of conductive agent acetylene black were uniformly ground for 40 min; 35 mg of binder polyvinylidene fluoride, 6 mg of polyrotaxyl polymer electrolyte (its preparation scheme sees the preparation method of polyrotaxyl lithium ion battery polymer electrolyte, without using porous support material, and without curing and drying) and 200 μL of 1-methyl-2-pyrrolidone were uniformly ground for 40 min; coated on the surface of aluminum foil, and dried at 80° C. for 8 h under vacuum conditions to obtain a positive electrode material; the positive electrode sheet was cut into a disc with R=0.6 mm, and the polymer electrolyte in the above-mentioned polymer electrolyte preparation example 1 was used to assemble a solid lithium ion half-cell, and then metallic lithium was used as the negative electrode.

Example 9

220 mg of lithium cobalt oxide and 45 mg of conductive agent acetylene black were uniformly ground for 40 minutes; 15 mg of binder polyvinylidene fluoride, 15 mg of polyrotaxyl polymer electrolyte and 150 μL of 1-methyl-2-pyrrolidone were added and uniformly ground for 40 minutes; coated on the surface of aluminum foil and dried at 80° C. for 8 hours under vacuum conditions to obtain the positive electrode material; the positive electrode sheet was cut into discs with R=0.6 mm, and the solid-state lithium-ion half-cell was assembled using the above polymer electrolyte. Then metallic lithium is used as the negative electrode.

Example 10

220 mg of lithium nickel cobalt aluminum oxide and 45 mg of conductive agent acetylene black were uniformly ground for 40 minutes; 15 mg of binder polyvinylidene fluoride, 15 mg of polyrotaxyl polymer electrolyte and 150 μL of 1-methyl-2-pyrrolidone were added and uniformly ground for 40 minutes; coated on the surface of aluminum foil and dried at 80° C. for 8 hours under vacuum conditions to obtain the positive electrode material; the positive electrode sheet was cut into discs with R=0.6 mm, and the solid-state lithium-ion half-cell was assembled using the above polymer electrolyte. Then metallic lithium is used as the negative electrode.

What is claimed is:

1. A polyrotaxane lithium-ion battery polymer electrolyte, characterized in that the polymer electrolyte comprises a polyrotaxane polymer and a conductive lithium salt;
the polyrotaxane lithium-ion battery polymer electrolyte is prepared from a linear polymer, a cyclic molecule, an end-capping molecule, a catalyst, and a lithium salt, wherein the linear polymer, the cyclic molecule, and the end capping molecule form the polyrotaxane polymer; a molar ratio of the linear polymer, the cyclic molecule, and the end-capping molecule is 1:(0.1-10):(0.1-10); wherein the catalyst is present at 0.1%-10% by mass based mass of the linear polymer, and the lithium salt is present at 10%-80% by mass based on the mass of the linear polymer; the polyrotaxane lithium-ion battery polymer electrolyte uses a porous support material as a carrier;
the linear polymer is selected from polyethylene glycol, polyvinyl alcohol, polypropylene glycol, or one or more of the sulfur, chlorine or fluorine substitutes of polyethylene glycol, polyvinyl alcohol and polypropylene glycol; a molecular weight of the linear polymer is in the range of 1000-1000000 g/mol;
the cyclic molecule is selected from one or more of crown ether group molecules and cyclodextrin group molecules;
the end-capping molecule is one or more of the following: hexamethylene diisocyanate (HDI), hexamethylene diisocyanate trimer (HDI trimer), diphenylmethane diisocyanate (MDI), toluene diisocyanate (TDI), (polymethyl polyphenyl isocyanate) (PAPI), (phenyl isocyanate) (PI), (isophorone diisocyanate) (IPDI), (octadecyl isocyanate) (ODI), dicyclohexylmethane diisocyanate (HMDI), lysine diisocyanate (LDI); a molecular weight of the end-capping molecule is in the range of 100-10000 g/mol;
the conductive lithium salt is one or more of the following: lithium hexafluorophosphate (LiPF$_6$), lithium perchlorate (LiClO$_4$), lithium bis(trifluoromethanesulfonyl)imide (LiTFSI), lithium bis(fluorosulfonyl)imide (LiFSI), lithium bis(oxalatoborate) (LiBOB), bis(trifluoromethanesulfonyl)methyl lithium (LiC(SO$_2$CF$_3$)$_3$), lithium difluorooxalatoborate (LiDFOB); and
the catalyst is one of the following: dibutyltin dilaurate, dibutyltin bis(acetylacetonate), azobisisoheptanenitrile (ABVN), azobisisobutyronitrile (AIBN), dimethyl azobisisobutyrate (AIBME), benzoyl peroxide (BPO), tert-butyl benzoyl peroxide (TBPB), methyl ethyl ketone peroxide (MEKPO).

2. The polyrotaxane lithium-ion battery polymer electrolyte according to claim 1, characterized in that the molecular weight of the linear polymer is in the range of 1000-1000000 g/mol.

3. The polyrotaxane lithium-ion battery polymer electrolyte according to claim 1, characterized in that the crown ether group molecule is selected from one or more of 18-crown ether-6, dibenzo-18 crown ether-6, 18-diaza crown ether-6, dibenzo-18-tetrathio crown ether-6, tetrabenzo-18-crown ether-6, cyclohexane-18-crown-6, 21-crown ether-7, and 24-crown ether-8, and the cyclodextrin type group molecule is α, β or γ type cyclodextrin, or a reaction product of etherification, esterification, oxidation, cross-linking, etc. of alcoholic hydroxyl groups on the surface of cyclodextrin, or one or more of chlorine and fluorine substituents of cyclodextrin.

4. The polyrotaxane lithium-ion battery polymer electrolyte according to claim 1, characterized in that the porous supporting material is one or more of the following: cellulose non-woven fabric, polyethylene non-woven fabric, polypropylene non-woven fabric, glass fiber non-woven fabric, polytetrafluoroethylene non-woven fabric.

5. The method for preparing the polyrotaxane-based lithium-ion battery polymer electrolyte according to claim 1, characterized in that it comprises the following steps:

1) dissolving the linear polymer and the cyclic molecule in a liquid solvent and stirring for 2-10 hours to allow the linear polymer to pass through the cyclic molecule, thereby forming a solution;
2) adding one or more end-capping molecules and a catalyst to the solution and continuing to stir for 2-10 hours to obtain a polyrotaxane polymer solution;
3) adding a certain amount of lithium salt to the polyrotaxane polymer solution to form a uniform solution, thereby obtaining a polyrotaxane polymer electrolyte mixed solution; and
4) The polyrotaxane polymer electrolyte mixed solution is coated on or immersed in a porous support material, and then cured by vacuum heating at 60-120° C. for 2-12 h to obtain a fully solid polymer electrolyte membrane.

6. The method according to claim 5, characterized in that the solvent is one of the following: N-methylpyrrolidone, ethylene carbonate, propylene carbonate, butylene carbonate, dimethyl carbonate, ethyl methyl carbonate, γ-butyrolactone, tetrahydrofuran, 2-methyltetrahydrofuran, acetonitrile, 1,2-dimethoxyethane, tetraethylene glycol dimethyl ether, triethylene glycol dimethyl ether, diethylene glycol dimethyl ether, and dimethyl sulfoxide.

7. A polymer-based lithium-ion battery with a polyrotaxane-based lithium-ion battery polymer electrolyte, characterized in that it comprises: a positive electrode, a negative electrode, and the polyrotaxane-based lithium-ion battery polymer electrolyte as described in claim 1, which is placed between the positive electrode and the negative electrode and has both the functions of a separator and an electrolyte.

8. The lithium-ion battery according to claim 7, characterized in that the positive electrode active material is one or more of lithium iron phosphate, lithium nickel cobalt aluminum (NCA), lithium-rich material (LLOs), lithium cobalt oxide ($LiCoO_2$), lithium fluorophosphate, lithium nickel cobalt manganese oxide, lithium manganese oxide, lithium nickel manganese oxide, lithium iron manganese phosphate, and lithium nickel oxide ($LiNiO_2$); and the negative electrode active material is one or more of metallic lithium, metallic lithium alloy, carbon silicon composite material, lithium titanate, graphite, lithium metal nitride, antimony oxide, carbon germanium composite material, and lithium titanium oxide.

9. The lithium-ion battery according to claim 8 is characterized in that preparing the positive electrode comprises the following steps:
(1) preparing a positive electrode material by grinding and mixing 50-90% by mass of the positive electrode active material and 5-30% by mass of a conductive agent acetylene black, adding 1-15% by mass of polyvinylidene fluoride (PVDF), 1-15% of the polyrotaxane polymer electrolyte, and 1-methyl-2-pyrrolidone to obtain the positive electrode material, wherein the 1-methyl-2-pyrrolidone is used to adjust a viscosity and is not included in a mass percentage composition of the positive electrode material; and
(2) coating the positive electrode material on a surface of aluminum foil and vacuum drying to obtain the positive electrode; wherein
metallic lithium or metallic lithium alloy is directly used as a corresponding negative electrode; or preparing the negative electrode includes the following steps:
(1) preparing a negative electrode material by grinding and mixing 35-85% by mass of the negative electrode active material and 5-30% by mass of a conductive agent acetylene black, adding 5-20% by mass of polyvinylidene fluoride (PVDF), 1-20% of the polyrotaxane polymer electrolyte and 1-methyl-2-pyrrolidone, grinding and mixing to obtain the negative electrode material; wherein the 1-methyl-2-pyrrolidone is used to adjust a viscosity and is not included in the mass percentage composition of the negative electrode material; and
(2) coating the negative electrode material on a surface of copper foil and drying to obtain the negative electrode; wherein the polyrotaxane polymer electrolyte in the positive electrode material and the negative electrode material comprises a polyrotaxane polymer and a lithium salt, wherein the polyrotaxane polymer comprises a linear polymer, a cyclic molecule, and a end-capping molecule; the lithium salt is present at 10%-80% by mass based on a mass of the polyrotaxane polymer.

* * * * *